Dec. 24, 1957   C. H. CARLIN   2,817,314
BIRD CAGES
Filed May 1, 1956

INVENTOR.
CHARLES H. CARLIN,
BY
Albert M Zalkind
ATTORNEY.

United States Patent Office 2,817,314
Patented Dec. 24, 1957

2,817,314

BIRD CAGES

Charles H. Carlin, Falls Church, Va.

Application May 1, 1956, Serial No. 581,956

2 Claims. (Cl. 119—17)

This invention relates to bird cages and more particularly to means for holding down a sheet or sheets of paper in the pan of the cage.

It is well known practice to line the pan of a bird cage with sheets of paper, for example newsprint or paper specially manufactured for such purpose which paper ultimately becomes soiled with a day or two of use and may then be disposed of. A problem exists in conjunction with this practice in that when a sheet of paper is placed on the bottom of the cage, that is in the pan, birds have a habit of pecking at the paper or clawing it and gradually ravelling it up so that the bottom of the pan is exposed and thus the purpose of the paper is nullified.

The principal object of my invention is to provide means for securely holding down a sheet of paper to the pan of a bird cage so that birds cannot cause it to ravel, which means is removable for convenient cleansing.

Another object of my invention is to provide a device which is adjustable so as to be usable with a large variety of sizes of bird cages.

A further object of my invention is to provide a device which will be extremely simple and easy to adjust and one which can be cheaply manufactured.

Other objects and features of my invention will be apparent from the appended drawing.

Briefly, my invention comprises a frame consisting of four angular L-shaped elements which are movable with respect to each other by means of slidable coupling pieces. Thus, a complete rectangular or square frame is effected which can be readily adjusted as to perimeter so as to repose around the margin of a sheet of paper laid in the pan of a bird cage.

Figure 1:
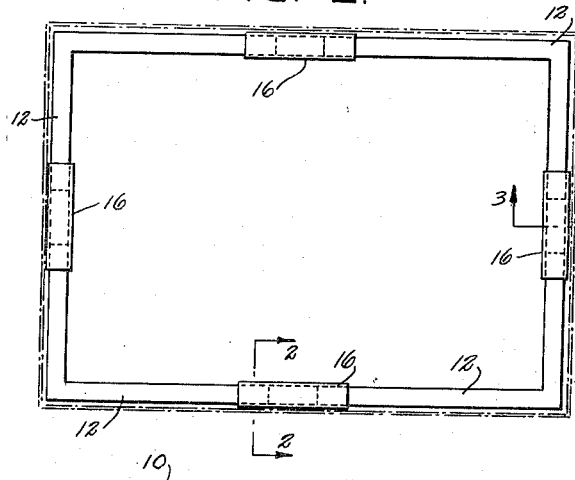
Fig. 1 is a plan view of my invention showing the essential elements of a hold down device.
Figures 2, 3:
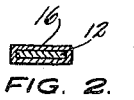
Fig. 2 is an enlarged section through 2—2 of Fig. 1.
Fig. 3 is an enlarged section through 3—3 of Fig. 1.

Referring now to the drawing, my invention comprises a frame 10 consisting of four flat pieces 12 each in the shape of an angle or elbow and which may be comprised of flat sheet material such as metal or plastic. The elements 12 have sides or legs which may be of equal length and are arranged to form a square or rectangle and are held together by means of coupling elements 16 which slidably telescope with the adjoining ends of the elements 12. The coupling members 16 may be made of metal or sheet plastic which may be bent to form a through channel or the coupling members 16 may be die cast or injection molded.

In any event, as seen in Fig. 1, the elements 12 telescope slidably into the coupling members 16 and it will be thus apparent that a frame of any desired size to fit the pan of a particular size of bird cage may be readily formed by simply juxtaposing the elements 12 with respect to each other. The frame is then laid on a sheet of paper which is to be used for lining the bottom of the pan. Thus, such a sheet of paper is shown as indicated by reference character 20, in phantom lines, in Fig. 1.

Figure 4:
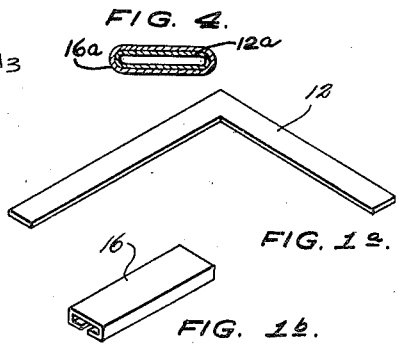
Fig. 4 is a section through a modification of the invention taken in a manner similar to Figs. 2 and 3.
Figure 1A:
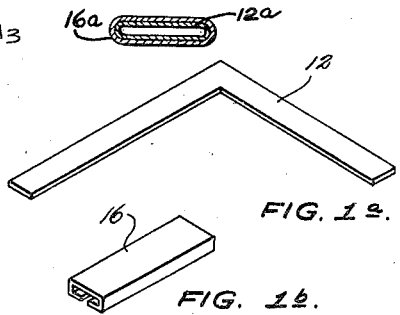
Figs. 1a and 1b are enlarged perspective views of a corner section and a coupling member therefor, respectively.
Figure 1B:
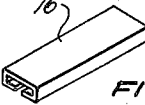

While the elements 12 may be made of solid pieces which can be die-cut or molded and which need not be even integral, for example each elements 12 can be two separate pieces joined at a mitred corner, another form of the invention, as indicated in Fig. 4, would utilize tubular pieces such as 12a and 16a. Such pieces may be molded or cast or formed by wrapping sheet material about suitable mandrels. Further, the undersurfaces may have a frictional casting, e. g., by spraying with various rubber solutions commercially obtainable.

Figure 5:
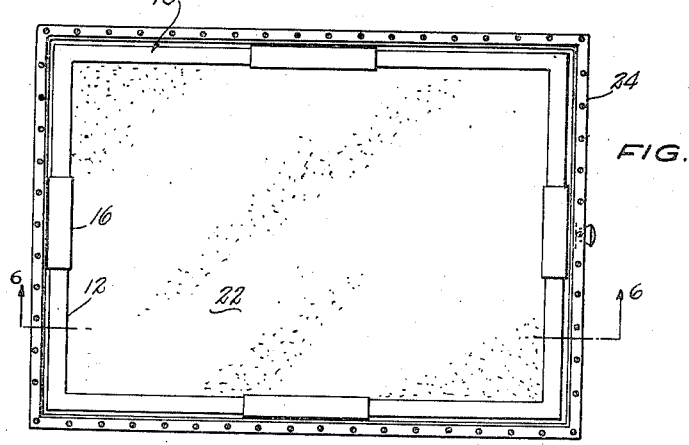
Fig. 5 is a plan view showing my invention in use disposed in the pan of a bird cage.
Figure 6:
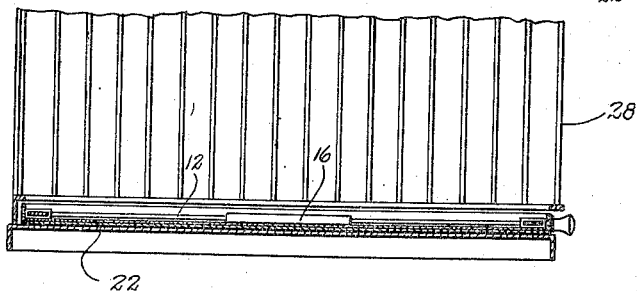
Fig. 6 is a section in elevation through 6—6 of Fig. 5.

Referring now to Figs. 5 and 6 there is illustrated a frame 10 comprised of the elements 12 and coupling members 16 resting on a sheet of paper 22 which will be understood to be used as surfacing for the pan 24 of a bird cage 28.

Figure 7:
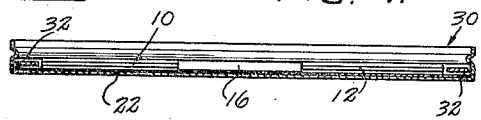
Fig. 7 shows a modified pan in coaction with a hold down device.

In Fig. 7 I disclose a pan 30 modified by being provided with channels 32 at one or more of the lower edges into which the elements 12 slidably fit so as to lock frame 10 to the pan. Thus, in Fig. 7, two channels 32 are shown, it being understood that the frame has been expanded so that parallel sides protrude into respective channels 32. From one to all four sides of a pan may be formed with channels in the manner taught.

It will, of course, be understood that the frame 10 may be introduced into the cage either by removing the pan or by sliding the pan through a side opening with which many cages are equipped.

I have found in practice that frames made of sheet plastic or metal approximately one-eighth inch thick and an inch or so wide has sufficient frictional area contiguous with the margin of a sheet of paper and also has sufficient weight to maintain the sheet of paper intact despite efforts made by birds to pull at the paper and cause it to ravel. Such a device successfully withstands the onslaught of birds either pecking at the paper or scratching it with their claws. It will, of course, be apparent that the particular materials and mode of manufacture of the device as disclosed hereinabove does not limit the invention. Thus, any suitable materials may be utilized and various types of adjustable coupling means may be found suitable without departing from the spirit of my invention. Further, my teachings may be applied to odd shapes of cages and even to circular cages by suitable design of the frames, as will be apparent to persons skilled in the art.

Accordingly, I do not seek to be limited to the precise illustration herein given except as set forth in the appended claims.

I claim:

1. A removable device for holding a sheet of paper to the bottom of a bird cage comprising a frame having a plurality of corner pieces, each corner piece having a pair of angularly related legs; a plurality of sleeves; said sleeves telescopically slidably joining respective legs of said corner pieces to effect said frame, said frame having a lower paper engaging surface, whereby said frame may be adjusted to extend marginally around the bottom of said bird cage and marginally secure a piece of paper to said bottom by cooperation therewith.

2. The combination of a bird cage and a removable device for holding a sheet of paper to the bottom of said bird cage comprising a frame having a plurality of corner pieces, each corner piece having a pair of angularly related legs; a plurality of sleeves; said sleeves telescopically slidably joining respective legs of said corner pieces to effect said frame, said frame having a lower paper engaging surface, whereby said frame may be adjusted to extend marginally around the bottom of said bird cage and marginally secure a piece of paper to said bottom by cooperation therewith.

References Cited in the file of this patent

UNITED STATES PATENTS

| | | |
|---|---|---|
| 1,842,575 | Allsbury | Jan. 26, 1932 |
| 2,065,923 | Jessen | Dec. 29, 1936 |
| 2,129,786 | Sacre | Sept. 13, 1938 |
| 2,189,449 | Morris | Feb. 6, 1940 |
| 2,488,424 | Morris | Nov. 15, 1949 |